United States Patent [19]

Sabes

[11] 4,133,424
[45] Jan. 9, 1979

[54] CONNECTING MEMBERS FOR THE ENDS OF TUBS OF A SCRAPER CONVEYOR

[75] Inventor: Jean Sabes, Anzin, France

[73] Assignee: Societe Anonyme dite: J. Sabes & Cli, Anzin, France

[21] Appl. No.: 712,059

[22] Filed: Aug. 5, 1976

[30] Foreign Application Priority Data

Aug. 6, 1975 [FR] France .................. 75 24547
Feb. 13, 1976 [FR] France .................. 76 04037

[51] Int. Cl.² .......................................... B65G 19/18
[52] U.S. Cl. ............................ 198/735; 198/583; 198/758
[58] Field of Search .......... 198/861, 758, 725, 717, 198/583, 735; 403/13, 14, 316, 335, 337, 363; 193/2 A, 35 J

[56] References Cited

U.S. PATENT DOCUMENTS

| 2,031,054 | 2/1936 | McCarthy | 198/861 |
| 3,300,031 | 1/1967 | Dommann et al. | 198/861 |
| 3,583,552 | 6/1971 | Renwick | 198/861 |
| 3,944,061 | 3/1976 | Braun | 198/861 |

FOREIGN PATENT DOCUMENTS

| 2201400 | 7/1973 | Fed. Rep. of Germany | 198/861 |
| 2335250 | 1/1975 | Fed. Rep. of Germany | 198/861 |

*Primary Examiner*—Evon C. Blunk
*Assistant Examiner*—Douglas D. Watts
*Attorney, Agent, or Firm*—Mason, Fenwick & Lawrence

[57] ABSTRACT

The invention relates to connecting members for the ends of adjacent tubs of a scraper conveyor for the use in mines in which each tub comprises two side members.

The supporting partition of each connecting member has a rear face serving as a support for one of the retaining flanges and extends transversely up to the corresponding side member or up to its extension. The supporting partition is located at the rear end of the projecting portion of the male member. The width of the lateral access opening for each partition is less than the maximum dimension of the cross-section of the corresponding locating slot of the partition. The junction zones between the lateral access opening and the locating slot at the partition constitute a lateral locking means for the connecting rods relative to the partition.

10 Claims, 13 Drawing Figures

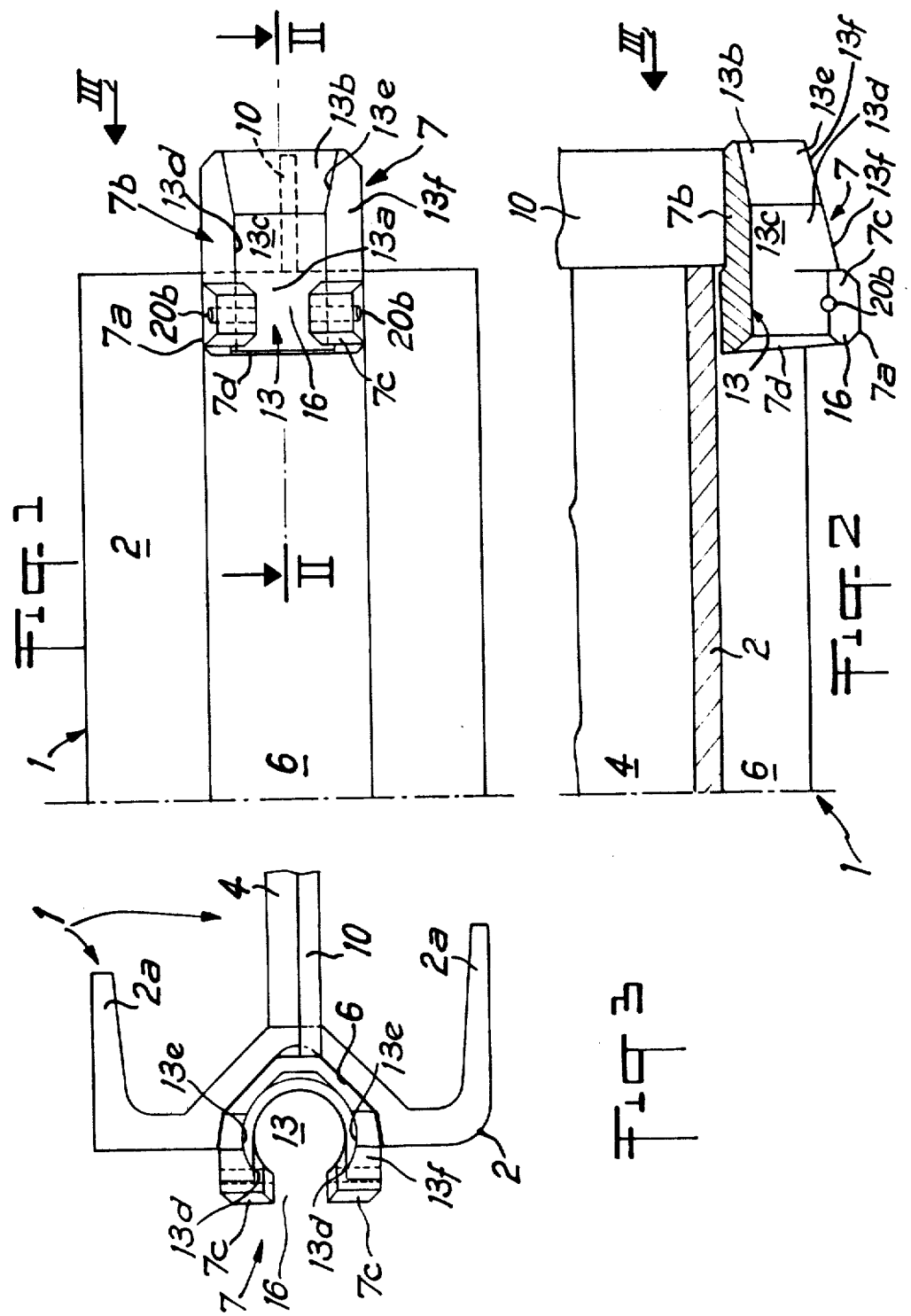

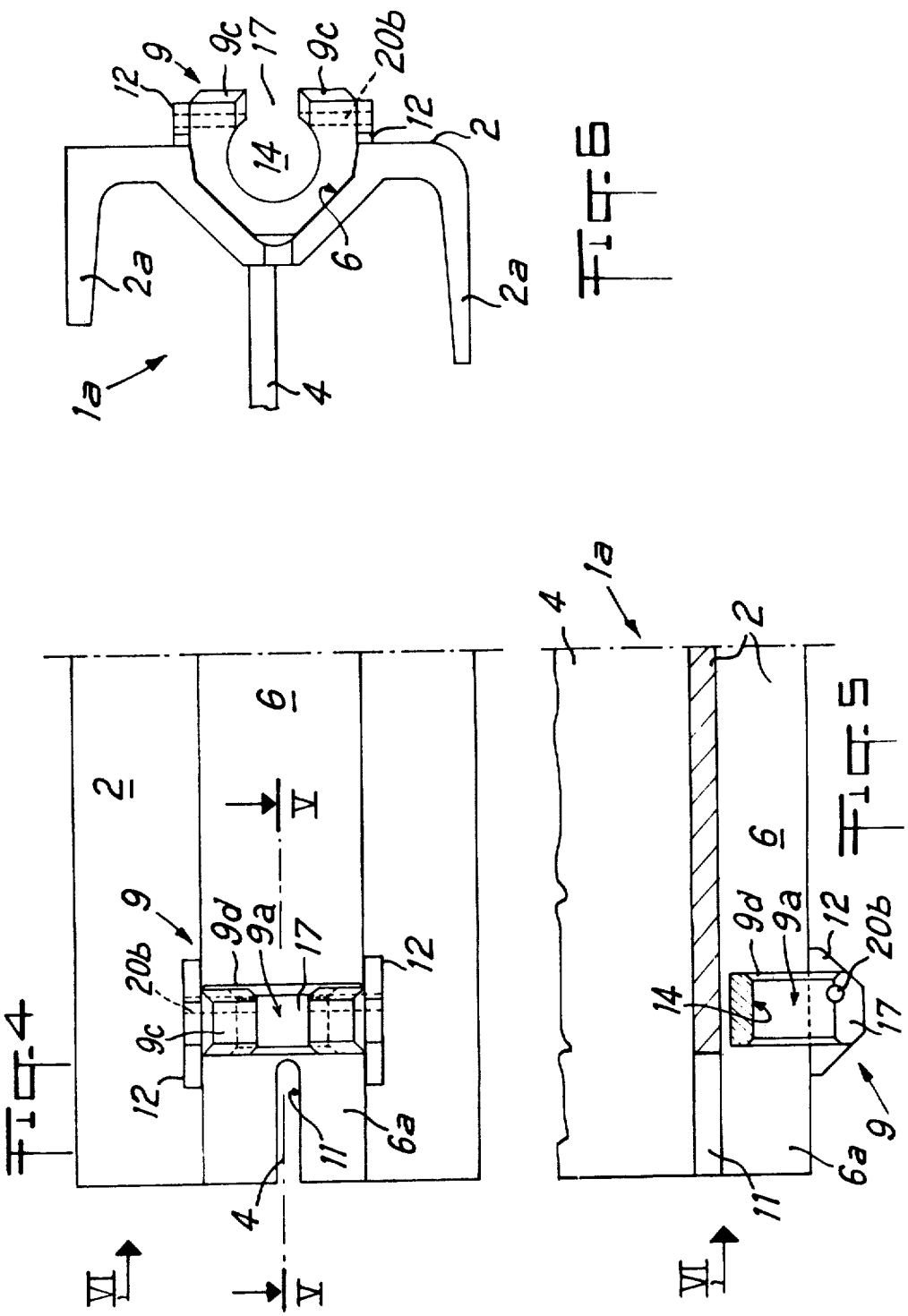

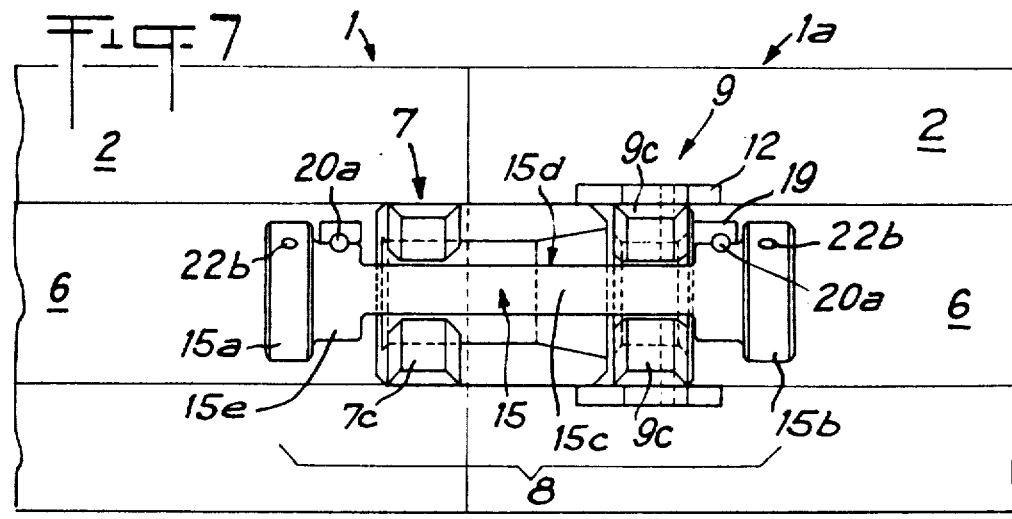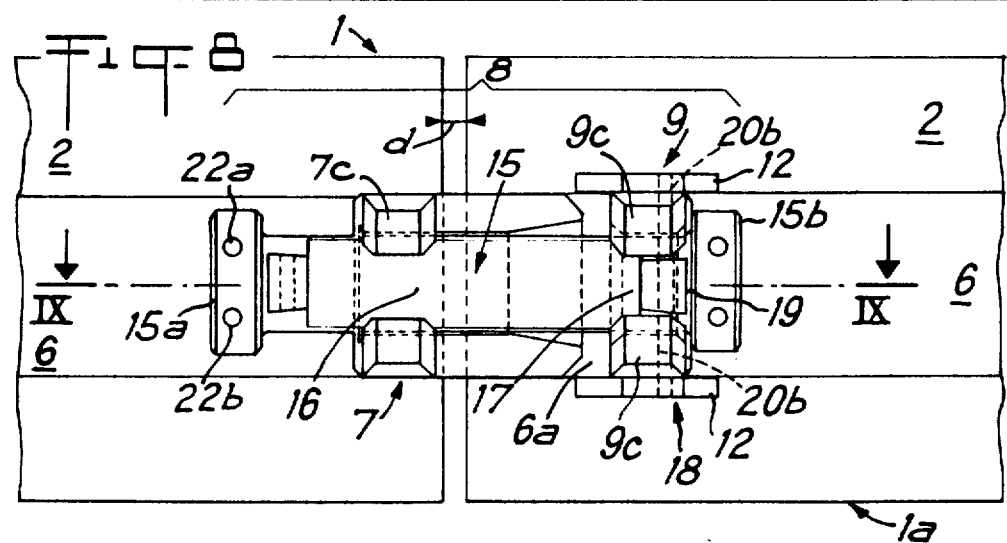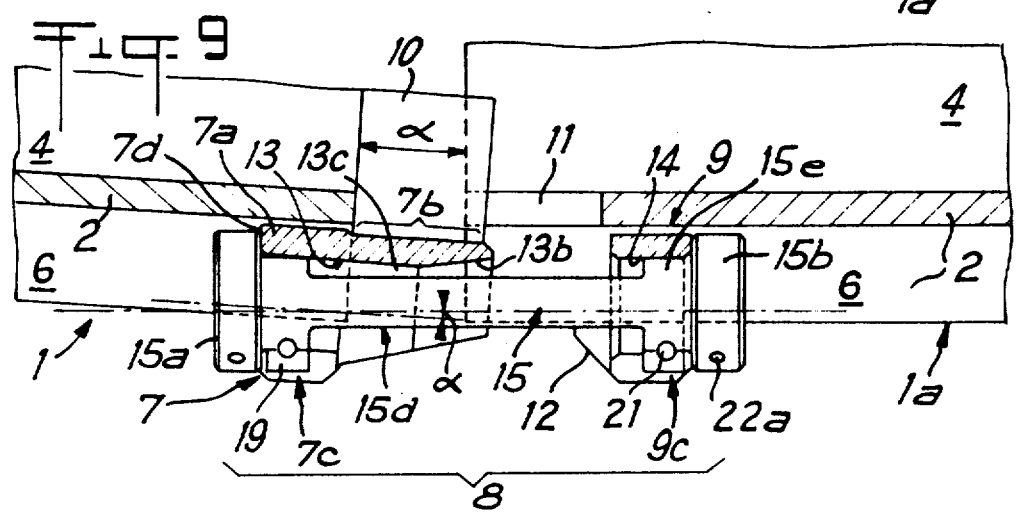

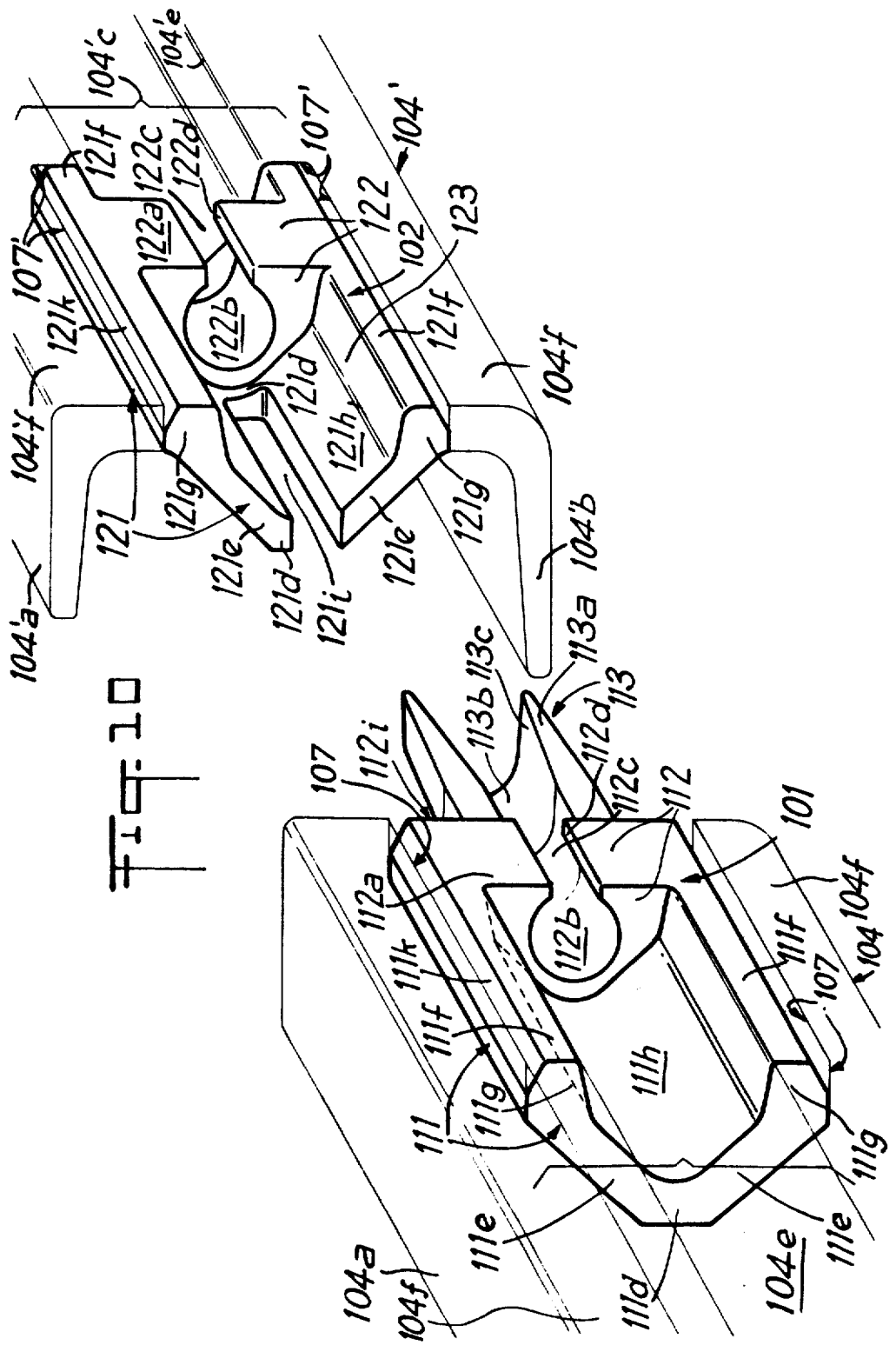

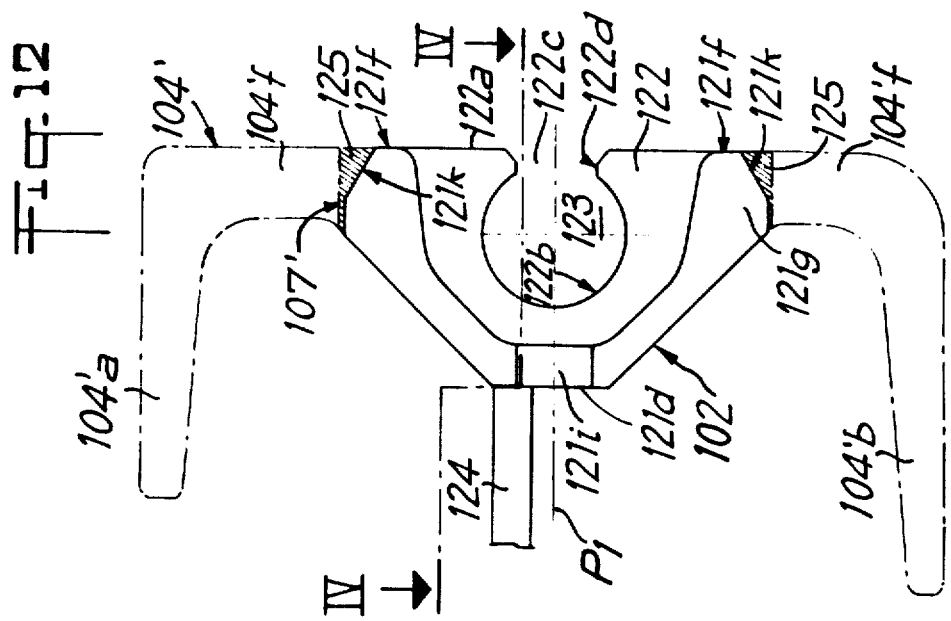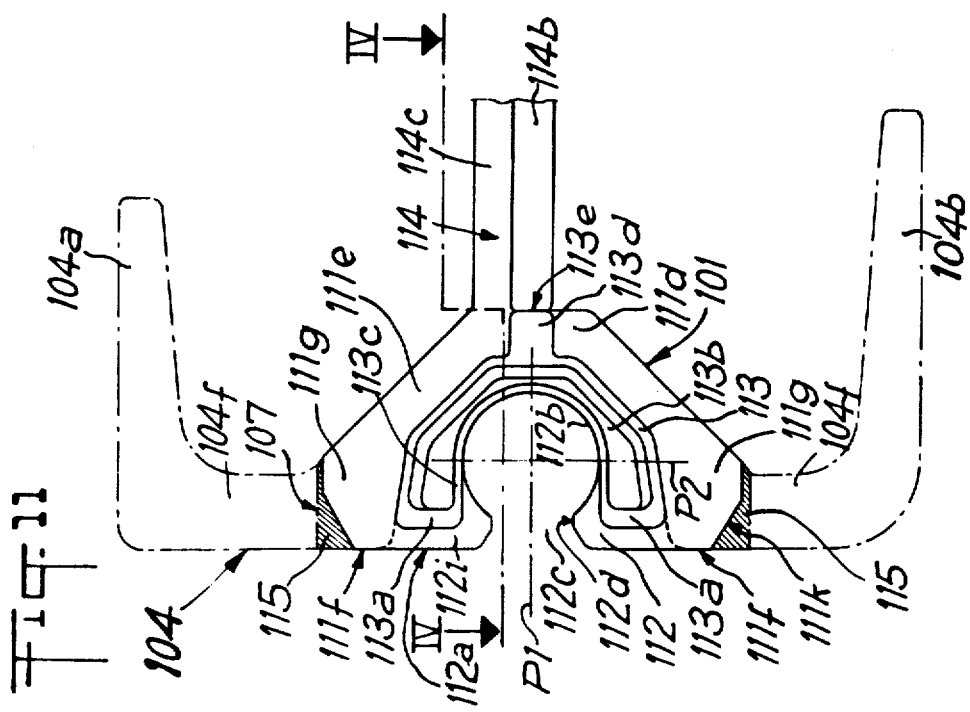

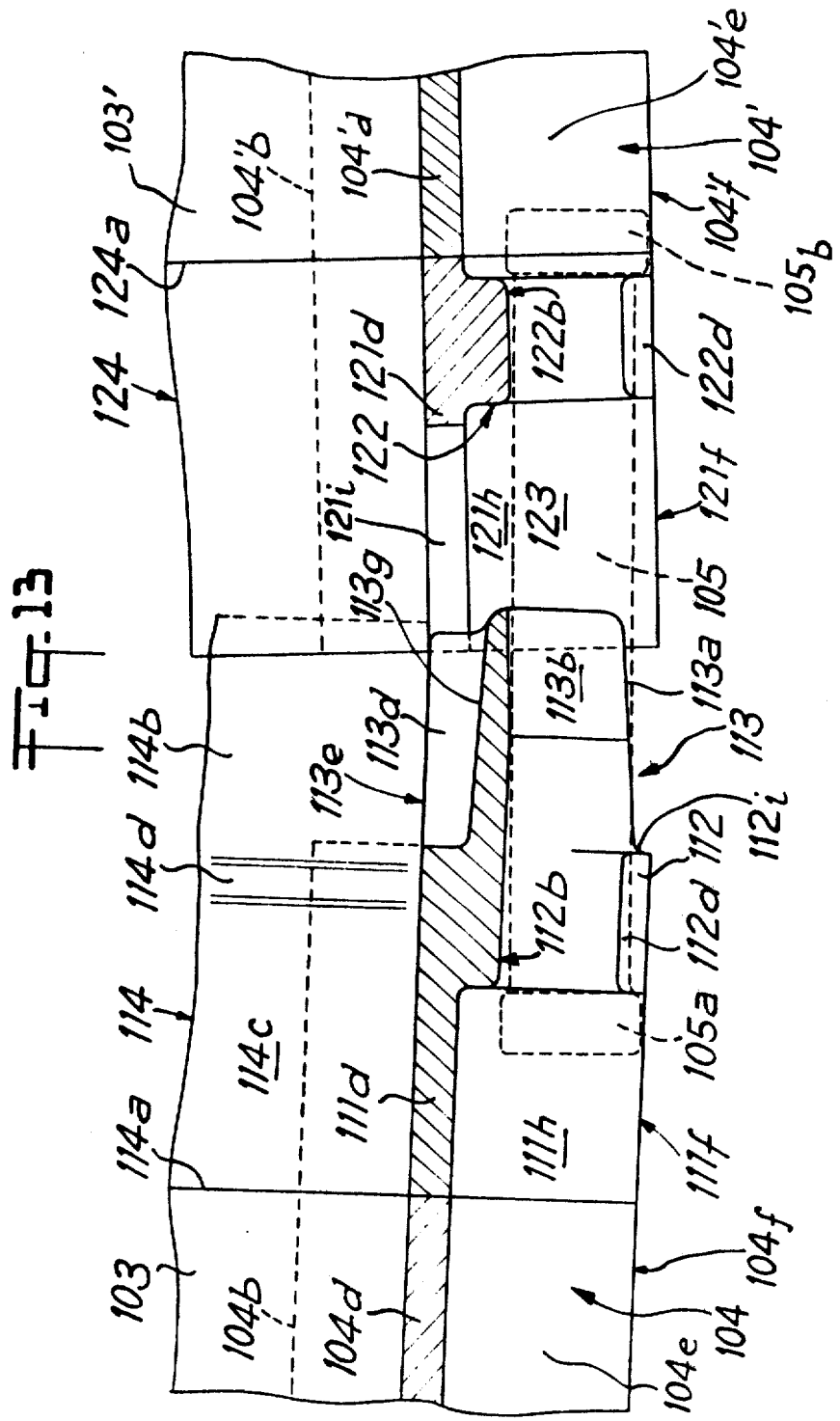

CONNECTING MEMBERS FOR THE ENDS OF TUBS OF A SCRAPER CONVEYOR

BACKGROUND OF THE INVENTION

The invention relates to connecting members for the ends of two adjacent tubs of a scraper conveyor for mines in which each tub comprises two side members arranged symmetrically relative to the median vertical plane of the tub and having an inverted M or sigma-shaped cross-section or profile and a median horizontal plate connecting the two median portions of two side members, the connecting members being fixed either to one or other end of each side member and comprising either a male member having a transverse supporting partition and a projecting member which extends parallel to the side member beyond the end of the corresponding tub or a female member which defines a connecting cavity able to receive the projecting portion of the other connecting member and which comprises a transverse supporting position recessed to the end of the corresponding tub whose length is the same as that of the connecting cavity and greater than that of the projecting portion, whereby each of the connecting members also comprises a locating slot which extends parallel to the corresponding side member and which serves to receive a connecting rod provided with two terminal retaining flanges, whose shoulders can cooperate with one or other of the supporting partitions, as well as a lateral access opening extending parallel to the said locating slot and issuing laterally from the outside of the said side member and the corresponding connecting member into the said locating slot.

Connecting members of this type are known, for example from French Pat. No. 69 24797 (2,016,116). In this case, the connecting members are very bulky and due to their rectangular cross-section cannot be adapted to the cross-section of inverted M or sigma-shaped side members. Due to the fact that in the known connecting members a locking cavity is used for the location of the retaining heads, the supporting partition of the connecting member of the male type is provided at the tapered end of the projecting portion thereof and the connecting rod section is very reduced. Despite the large dimensions of the connecting members, the forces which can be transmitted by the connecting rod are relatively small. In addition, the special shapes of the different locking and locating cavities make manufacture difficult. Due to the fact that in the known case, one of the retaining flanges of the connecting rod can be axially forced against the axial locking means of the same rod, the latter or the locking means can be damaged so that the separation of two adjacent tubs becomes very difficult or even impossible.

BRIEF SUMMARY OF THE INVENTION

The object of the present invention is to eliminate these disadvantages and to propose connecting members of the type described hereinbefore which have an increased strength despite reduced dimensions, which provide the retaining flanges with large supporting faces, which permit the use of a large diameter connecting rod despite their relatively small overall dimensions and which, whilst ensuring a locking of the connecting rod in the locating recesses of the connecting members, prevent any significant transmission of stresses, other than tensile stress between them and the said connecting rod.

According to the invention, these objects are achieved in that:

the supporting partition of each connecting member has a rear face which serves as a supporting face for one of the retaining flanges and extends transversely up to the corresponding side member of up to the extension of the said side member, the supporting partition of the male connecting member is provided at the rear end of the projecting portion thereof, the width of the lateral access opening of each supporting partition is less than the maximum dimension of the corresponding locating slot cross-section of the partition and the junction zones between the lateral access opening and the locating slot of the said partition constitute a lateral locking means for the connecting rod relative to the supporting partition.

As a result of these measures, it is possible to construct connecting members which meet the sought objectives.

With a view to further reducing the overall dimensions of the connecting members in such a way that, whilst not laterally projecting beyond the inverted M or sigma-shaped section of the side members, they have an increased rigidity and offer the connecting rod a locating slot with a large cross-section and to the retaining heads of the said rod, adequate supporting surfaces with regard to the supporting partitions, the present invention further proposes that each connecting member has a profiled section which defines a groove whose cross-section is identical to the cross-section of the median V-shaped portion of a side member having an inverted M or sigma-shaped cross-section, the supporting sections have a planar lateral face located in the same plane as the planar lateral face of the connecting member and, after fitting the latter, in the corresponding side member also located in the same plane as the lateral face of the latter, the supporting partition of each connecting member is made in one piece with the V-shaped section of the corresponding connecting member and extends over the entire cross-section of the groove of the said profile section and the supporting partition of the male connecting member serves as a connecting body between the rear end of the projecting portion and the front end of the profiled sections of the said male connecting member.

As a result of this concept, extremely rigid and strong connecting members are obtained in the case of minimum overall dimensions which do not laterally project beyond the tubs. It is therefore possible to use the whole cross-section of the V-shaped groove of the profiled section to give the connecting rod and the supporting heads large cross-sections in the case of greatly reduced overall dimensions.

To reduce the overall dimensions of the connecting members, it has already been proposed, for example by British Pat. No. 759,031 relating to tubs with composite side members with a central inner V-shaped section and an outer U-shaped section whose central portion is welded to the said central section, to replace an end portion of the central section by a connecting member with the same cross-section but with slightly longer branches, to cut in the outer section with reference to the connecting member an assembly opening, to the edges of which are welded the extended branches of the connecting member and to provide the open lateral groove of the connecting member either with a male guidance element or with a female guidance element, each having a supporting transverse partition with a locating slot for the connecting bolt or rod. However, also in this case, the arrangement of the supporting partition at the front end of the projecting portion of the male type connecting member leads to locating slots with a very small cross-section and therefore the use of a connecting rod with a very small cross-section and which is unable to transmit large tensile stresses.

It is advantageous to join the two male or female connecting members located in the same end area of a tub by a wear-resisting plate welded to the median portion of the inner face of the said connecting member, said face being turned towards the other connecting member of the same end area of the tub, whereby the said wear-resisting plate extends over the entire length of the corresponding connecting member.

Thus, it is possible to prepare beforehand pairs of connecting members equipped with their wear-resistant plate, in such a way that the repair of a damaged tub is greatly facilitated. Moreover, the rigidity of the assembly and of its connection with the edges of the assembly opening, the side members and the median plate of the tub is greatly increased.

In order to avoid the use of wear-resisting plates having lateral edges cut with a view to their adaptation to the tapered contour of the projecting portion or male guidance element of the connecting member, this projecting portion has, in its face turned towards the other male type connecting member of the same tub level with the wear-resistance plate, a longitudinal rib whose top face is located in the same plane as the inner vertical median face of the profiled section of the said connecting member, whereby one of the edges of the said wear-resisting plate is welded to the said vertical inner face.

In order to permit the introduction of the projecting portion of the male type connecting member into the connecting cavity of the adjacent female connecting member and belonging to the other tub, the profiled section of the male type connecting member has a longitudinal passage opening starting from its front face in the top wall of the said section and extending over a length corresponding to that of the projecting portion of the said male member.

In many cases it is advantageous for two male type connecting members to be located on the same side of the same tub, being joined together by a wear-resisting plate, preferably welded to the outer face of the projecting portion of each male type connecting member, as well as to the corresponding end of the median plate of the tub and whereby at the other end of the tub the side members have, on their portion located in front of the female type connecting member, an oblong recess which serves to receive the wear-resisting plate.

With a view to facilitating slight displacements of one tub relative to the other, the supporting face of each connecting member and which contacts with the retaining flange of the said connecting rod is located in a vertical plane which is slightly inclined relative to the locating slot axis.

To facilitate the guidance of the male type connecting member, it is advantageous for the female type connecting member to have guidance plates for the projecting portion of the male type connecting member.

Advantageously, the female type connecting member has a connecting cavity which is constituted by the groove of the profiled section of the said corresponding female connecting member, said groove being located between the front end and the supporting partition of the female connecting member.

With a view to facilitating slight angular displacements of one tub relative to the other, the locating slot provided in the projecting portion and linked with that of the supporting partition of the male connecting member, as well as the lateral access opening of the said projecting portion progressively widen in the direction of the free end of the said projecting portion.

Advantageously, the locating slot of the projecting portion has a semi-cylindrical part and a semi-truncated cone-shaped part connected thereto by its small face, whereby the two portions of the slot are located on one side of the vertical radial plane of the said locating slot, said side being turned towards the other connecting member of the same tub end, and the access opening to the said locating slot of the projecting portion has two faces which extend perpendicular to the radial vertical plane and parallel to the generating lines of the locating slot of the projecting portions, said generating lines being located in the said vertical radial plane.

With a view to facilitating the connection by welding between the connecting members and the corresponding side members in the mounting openings of the said side members, at least the upper and lower faces adjacent to the vertical face of the shaped section of the connecting member are chamfered.

BRIEF DESCRIPTION OF THE DRAWINGS

Other and further objects of the present invention will be apparent from the following description and claims and are illustrated in the accompanying drawings, which, by way of illustration, show preferred embodiments of the present invention and the principles thereof, and what are now considered to be the best modes contemplated for applying these principles. Other embodiment of the invention embodying the same or equivalent principles may be used and structural changes may be made, if desired, by those skilled in the art, without departing from the invention and the scope of the appended claims.

In the drawings show:

FIG. 1 a side elevational view of a tank end provided with a first embodiment of a male type connecting member.

FIG. 2 a plan view of a cross-section of part of the tank end along the line II—II of FIG. 1.

FIG. 3 a front elevational view in accordance with the arrow III of FIGS. 1 and 2.

FIG. 4 a side elevational view of a tank end provided with a first embodiment of a female type connecting member.

FIG. 5 a plan view of a cross-section of part of the tank end along the line V—V of FIG. 4.

FIG. 6 a front elevational view in accordance with the arrow VI of FIGS. 4 and 5.

FIG. 7 a side view of the two tank ends assembled by means of the connecting members according to the invention and forming part of the coupling device, whose connecting rod or pin is shown in the introduction position in the said connecting members.

FIG. 8 a side view identical to that of FIG. 7 but with the connecting pin occupying its locking position.

FIG. 9 a plan view of the cross-section of the corresponding ends of two adjacent tubs along the line IX—IX of FIG. 8, but in which the two ends are displaced in angular manner in the horizontal sectional plane and are spaced from one another within the limits allowed by the connecting members.

FIG. 10 a perspective view of another embodiment of the two male and female connecting members, whereby each of which is to be fixed by welding to a side member of a tub.

FIG. 11 a front view of the male connecting member of FIG. 10.

FIG. 12 a front view of the female connecting member according to FIG. 10.

FIG. 13 a plan view of a cross-section of two male and female connecting members in the coupling position, along the broken lines of FIGS. 11 and 12.

DETAILED DESCRIPTION OF THE PREFERRED EMBODIMENTS

As is known, each tub or chute 1 of a scraper conveyor for mines comprises two parallel side members 2 and a median plate 4 which determines the spacing between the two side members 2 and which connected them roughly at mid height thereof. The cross-section of the side members 2 resembles a sigmaor an inverted M. The two side members 2 are arranged symmetrically to one another in such a way that the horizontal branches 2a of one of the side members extend towards those of the other side member and the median groove or cavity 6 of each side member is located on the outside of the tub, whereby the cross-section of said median groove or cavity 6 is approximately V-shaped (cf e.g. FIG. 1).

On one of the ends of the tub 1, each side member 2 has a male type connecting member 7 (cf also FIGS. 7 to 9) and female type connecting member 9 is fixed to the other end of the same side member 2. The male connecting member 7 of tub 1 and the female connecting member 9 provided on the adjacent end of the following tub 1a form part of a coupling device 8. In part, members 7 and 9 have a periphery which exactly adapts to the shape of the median groove or cavity 6 to which they fixed, for example, by welding. The rear portion 7a of the male member 7 has a design which is substantially identical to that of the female member 9 (cf particularly FIGS. 1 to 6). The rear portion 7a and the female member 9 are designed in the form of transverse supporting partitions 7a, 9a for a connecting member 15. The front portion 7b of the male connecting member 7 projects beyond the corresponding end of the side member 2 in the direction of the adjacent tub 1a and has a length such that in the contact position between the front faces of the side members 2 of two adjacent tubs 1 and 1a (cf FIG. 7) the end face of the front portion 7b of the male member 7 is only at a very short distance from the corresponding front face of the female member 9, for example, about 1 millimeter. Thus, as soon as the front faces of the side members 2 wear slightly, the front faces of the male and female connecting members 7 and 9 bear against one another and thus contribute to the transmission and taking up of longitudinal compressive stresses. In addition, the said male and female connecting members 7 and 9 can be made from a stronger material than that forming the side members 2, or at least the central portion of the said side members. The front portion 7b of the male member 7 has a periphery, which, with a certain lateral clearance, fits into the front portion 6a of the median groove 6. Said portion 6a is located in front of the female connecting member 9 and serves to receive the said projecting or front portion 7b of the male connecting member 7.

The front portion 7b of the two male connecting members 7 fixed to the same tub 1 are joined together by a connecting or wear-resisting plate 10, welded both to the outer face of the said front portion 7b and to the corresponding end of the median plate 4. Obviously, at least the largest portion of the wear-resisting plate 10 is located below the level of the inner face of the media plate 4 so that it can slide below the median plate 4 of the adjacent tub 1a and optionally cover the opening which is formed during the spacing apart of the two adjacent tubs 1 and 1a (cf FIGS. 1 and 3 and 9). To permit the median plate 4 of the adjacent tub 1a and the wear-resisting plate 10 to overlap during the moving together of tubs 1 and 1a, the side member portion located in front of the female connecting member 9 has an oblong recess 11 which is made parallel to the horizontal branches 2a in the median portion in the form of a groove 6 of side member 2 (FIGS. 5, 6 and 9), said oblong recess 11 serving to receive the wear-resisting plate 10.

With a view to reinforcing the fixing of the female connecting member 9 to its side member 2 and to deflect any object which could strike against it, more specifically when the said member laterally projects from the outer vertical face of the side member, guidance plates 12 are provided above and below the projecting portion of female member 9 which at the same time prevent the vertical displacement of two adjacent tubs 1 and 1a relative to one another when said two tubs are in the close together position (FIG. 7). However, as soon as the ends of adjacent tubs 1 and 1a are spaced apart by a certain distance d, corresponding approximately to the overhang of the guidance plates 12 relative to the female connecting member 9, the two adjacent tubs have a certain vertical mobility relative to one another which obviously is limited by the vertical clearance existing between the rectilinear groove 6 of the side member and the front portion 7b of the male connecting member 7 (FIG. 8).

Each connecting member 7 and 9 has a locating slot 13 and 14 extending axially from end to end of the corresponding connecting member and which serves to receive, with a certain lateral clearance, the intermediate portion in the form of a rod of a connecting member 15, which also forms an integral part of the coupling device 8 and which is constituted by a preferably monobloc connecting pin. The locating slots 13 and 14 has an at least approximately cylindrical or bitruncated cone-shape, at least as regards the rear portion 7a of the male connecting member 7 and female connecting member 9. The front or projecting portion of the locating slot 13 of the male member 7 preferably has a truncated cone shape 13b, widening out towards the front end of the said male member 7 and adjoining within the said member to the cylindrical portion 13a of the said locating slot 13.

In order to facilitate the rapid connection of two adjacent tubs, each male member 7 or female member 9 has on its outer side, i.e. on its side remote from the side member to which it is fixed, a lateral access opening 16 or 17 extending over the entire length of the corresponding connecting member 7 or 9 and issuing laterally into the locating slot 13 or 14. The access opening 16 or 17 is located on either side of the horizontal plane passing through the access of the locating slot 13 or 14 and optionally coinciding with the plane of symmetry of the median groove 6 of the side member 2. On the rear portion 7a of the male member 7 and on the female member 9, openings 16 or 17 have a height which is less than the diameter of the rear portion of the opening of locating slot 13 or 14. Thus, opening 16 or 17 is defined by a type of double retaining grip 7c or 9c forming an integral member of stop members 7 or 9 and which partly encircle the median portion, i.e. the connecting rod of the monobloc pin 15, when the latter occupies a given position within the opening 16 and 17. Thus, the junction zones between the thus lateral access opening 16 or 17 and the corresponding locating slot 13 or 14 constitute a lateral locking means of the connecting rod of pin 15 relative to the transverse supporting partition 7a or 9a. Relative to the front portion 7b of the male connecting member 7, the height of access opening 16 is identical to the diameter of locating slot 13, said diameter being taken in the vertical radial plane. The locating slot 13, level with the portion 7b of male member 7 is composed of a cylindrical portion 13c of semi-circular section followed by the truncated cone-shaped portion 13b also of semi-circular section, said two portions of semi-circular section 13c, 13b being located on the side of side memer 2 and followed laterally towards the outside, from the vertical radial plane passing through the axis of locating slot 13, on the one hand by projections with horizontal inner faces 13d, and on the other by projections with inclined inner faces 13e, in accordance with the two generating lines of the truncated cone-shaped portion 12b, which are located in the radial vertical plane of the locating slot 13. In addition, projections 13d and 13e are delimited by a vertical lateral face 13f inclined from the outside towards the inside in the direction of the front end of the male connecting member (cf FIGS. 1 to 3 and 7 to 9). Moreover, the rear portion 7a, also called the supporting partition of the male connecting member 7 has a vertical supporting face 7d which can be slightly inclined relative to the access of locating slot 13 in such a way that the side of the supporting face 7d, adjacent to side member 2 is located to the rear relative to the side of the supporting face, remote from the said side member (cf FIGS. 2 and 9). Thus, the connecting pin 15 can be inclined by a certain angle α relative to the axis of the locating slot 13, said angle being in the horizontal plane parallel to the median plate 4, whilst supported flat on the supporting face 7d of the supporting partition 7a of male member 7. Obviously, the vertical and rear supporting face 9d of supporting partition 9a of the male member 9 can have an identical arrangement, the only difference being that the inclination of supporting face 9d is such that it is the adjacent side of side member 2 which is closer to the front end of female member 9 than the side of supporting face 9d remote from said side member 2.

The connecting pin 15 which is made in one piece has, at each end, a retaining flange 15a, 15b which serves to bear on the rear supporting face 7d or 9d of the supporting partition 7a, 9a of the corresponding member 7 or 9, as well as an intermediate connecting rod 15c. This intermediate rod 15c is in one piece with the retaining flanges 15a, 15b and has two flat faces 15d which are parallel to one another and spaced from one another by a distance less than the minimum height of access opening 16 or 17 level with the opposite edges of the retaining grip 7c or 9c of the supporting partitions 7a, 9a of connecting members 7 or 9. The remainder of the surface of connecting rod 15c is cylindrical and the diameter thereof is such that on the one hand a certain clearance, e.g. of the order of 1 to 4mm exists between the cylindrical surface of circular cross-section of the connecting rod 15c and the inner face defining the locating slot 13 or 14 and on the other hand the pin 15 cannot laterally move out of the supporting partition 7a, 9a of the connecting members 7 and 9 when the flaps 15d are inclined relative to the opposite faces of the grip 7c or 9c, said faces being opposite to one another and defining the access opening 16 or 17. The flats 15d can extend over the entire length of the intermediate rod 15c and optionally even extend beyond, passing onto the retaining flanges 15a, 15b, which would not then have a cylindrical periphery entirely closed on itself. Obviously, the diameter of the retaining flanges 15a, 16b is slightly less than the external diameter of the supporting face 7d or 9d of the connecting members. The length of the portion of the intermediate rod 15c comprising the flats 15d is at least equal to the minimum spacing of the supporting faces 7d and 9d of the connecting members 7 and 9 in the moved together position of adjacent tubs 1 and 1a (cf FIG. 7), but the total length of the intermediate rod 15c between the retaining flanges 15a and 15b is such that the ends of side members 2 of adjacent tubs can be spaced apart from one another by a distance which is only slightly less than the width of the wear-resisting plate 10 between the two male connecting members 7 of one and the same tub 1 (cf FIG. 9).

According to the embodiments shown in FIGS. 7 to 9, the two parallel flats 15d do not extend over the entire length of the intermediate rod 15 but instead stop at a certain distance from the retaining flanges 15a, 15b in such a way that rod 15c has ends 15e with a cylindrical periphery of an entirely closed circular cross-section, whereby the diameter of the cylindrical ends 15e is always equal to that of the circular cylindrical surface of rod 15c located between the two flats 15d.

One construction of the locking means 18 of the connecting pin 15 in its coupling position in which it cannot move out of the male and female connecting members 7 and 9 consists of a locking wedge 19 fixed, for example, by welding, to one end of the intermediate rod 15c in the vicinity of the corresponding retaining flange 15a or 15b and parallel to a flat 15d, whereby the height of this locking wedge 19 is slightly less than the spacing between opposite edges of retaining grips 7c or 5c, said edges defining the access opening 16 or 17. Thus, after introducing the rod 15c into the corresponding locating slots 13, 14 whilst the flats 15d are parallel to the edges of the retaining grips 7c and 9c defining the lateral access openings 16, 17 and whilst adjacent tubs 1 and 1a are in the close together position (FIG. 7), it is merely necessary to pivot pin 15 by 90° in such a way that the locking wedge 19 is located level with the access opening and to then axially displace the said pin 15 until one of the retaining flanges 15a, 15b bears against the supporting face of the corresponding connecting member (15b in FIG. 8, 15a and 15b in FIG. 9). To prevent one of the locking wedges 19 from unexpectedly moving out of the access opening of the associated stop member, it is also possible to provide the locking wedge 19 and the connecting member 7 or 9 with holes 20a, 20b, whereof those 20b provided on the connecting member are aligned with one another and whereof that 20a located on the said wedge 19 is parallel to the flats 15d. When the wedge 19 is introduced into the opening 16 or 17, these holes 20a, 20b are aligned and it is then possible to engage in the said holes 20a, 20b a locking pin 21 which is not subject to any shear stress, because the tensile stresses applied to the pin 15 are taken up by the retaining flanges 15a, 15b. This pin 21 merely prevents the axial displacement of pin 15 relative to one of the connecting members 7 and 9 (member 9 in FIGS. 8 and 9). To facilitate the pivoting of pin 15 by a quarter of a turn, on at least one of the retaining flanges 15a, 15b, radial control holds 22a, 22b are provided which are accessible from the periphery of the said flange and from the side adjacent to the locking wedge 19, whereby they define between them an angle between 60° and 100°. If an actuating member is introduced into one or other of the holes 22a and 22b, it is possible to pivot the said pin in one or other direction.

Normally, adjacent tubs 1, 1a are completely adjacent to one another (FIG. 7) or very close together (FIG. 8). It is only during the scraping of the tubs that the latter move apart to the maximum so as to give a certain angular freedom, without any disengagement thereof. It is in this particular case that the coupling device 8 completely fulfills its function and permits the transmission of tensile stresses from one tub to the other without the constituent parts being subject to disadvantageous effects.

According to the embodiment described hereinbefore, the connecting members 7 and 9 are directly fixed by welding to the side members of the tub. An embodiment will now be described in which the connecting members form part of interchangeable end sections of side members.

Such an embodiment is shown in FIGS. 10 and 12 whereby the male connecting member 101 and the female connecting member 102 are shown in thick lines and an end portion of the corresponding side members of the tubs is shown in thin lines. For a considerable time, the general concept of tubs for scraper conveyors for mines has been known, said tubs each having two side members, whose section is an inverted M or a sigma and which are arranged symmetrically to one another in such a way that the tops of their central portions are close together, said tops being interconnected by a median plane. For information purposes, reference is made to French Pat. No. 1,114,925, which describes tubs of this type.

Thus, each tub has a median plate 103 or 103' and two side members 104 or 104', with an inverted M or sigma-shaped section. This section has two substantially horizontal branches 104a, 104b or 104'a, 104'b constituting the upper portion 104a or the lower portion 104b and a median portion 104c or 104'c in the form of a V, whose top wall 104d or 104'd is vertical and links the two inclined branches 104e or 104'e, to which the horizontal branches 104a and 104b or 104'a and 104'b are connected by vertical walls 104f or 104'f. At each end of the side member 104 or 104' is cut an assembly opening 107 or 107', provided with reference to the median V-shaped portion 104c or 104'c and extending horizontally from the front locating face 104 or 104', substantially in the junction zone between an inclined branch 104e or 104'e and the corresponding vertical wall 104f or 104'f in the direction of the other end of the said side member 101 or 104' over a predetermined length. This assembly opening 107 or 107' serves to receive a connecting member, namely either a male member 101 or a female member 102.

Each connecting member 101 or 102 is made in one piece by moulding, forging or stamping from a special steel with a high resistance to wear and has a profiled section 101 or 121, whose cross-section is in the form of a stylized V and identical to that of the median portion 104c or 104'c of side member 104 or 104'. The profiled section 111 or 121 has a vertical top wall 111d or 121d located on the so-called inside of the said section, because the said side is turned towards the inside of the tub. This section 111 or 121 also has oblique walls 111e or 121e connected to the top wall 111d or 121d and extending towards the outside and, either towards the top or towards the bottom, terminating by so-called junction walls 111g or 121g, extending roughly horizontally and whose outer terminal and lateral planar face 111f or 121f is vertical and is located in the same vertical plane as the outer face of the vertical walls 104f or 104'f of the side member 104 or 104'. Due to the special configuration of the profiled section 111 or 121, the outer face thereof defines a longitudinal groove 111h or 121h, whose cross-section is identical with that of the side member 104 or 104'.

Each connecting member 101 or 102 also comprises a transverse supporting partition 112 or 122 which extends perpendicular to the longitudinal extension of the side member 104 or 104' and whose outer lateral planar face 112a or 122a is located in the same plane as the outer planar face 111f or 121f of the profiled section 111 or 121 of the connecting member 101 or 102 and therefore in the same plane as the lateral outer face 104f or 104'f of side member 104 or 104' after fitting the said member 101 or 102 in the opening 107 or 107' thereof. Obviously, the supporting partition 112 or 122 is in one piece with the profiled section 111 or 121 and extends upto the base of the longitudinal groove 111h or 121h. A locating slot 112b or 122b is provided in each supporting partition 112 or 122 and extends parallel to the longitudinal extension of the corresponding profiled section 111 or 121 over the entire thickness of the said supporting section. The locating slot 112b or 122b has a cylindrical contour of horizontal axis and is laterally accessible from the outer lateral face 112a or 122a of the supporting partition 112 or 122 through a lateral access opening 112c or 122c, whose width is less than the maximum diameter of the locating slot 112b or 122b and which serves for the lateral evacuation and introduction of a connecting rod 105 having two retaining flanges or heads 105a and 105b which can be applied against the rear transverse face of the corresponding supporting partition (cf FIG. 13). For reference purposes, it is pointed out that the connecting rod 105 is designed in such a way that in a given position it can be laterally introduced into or removed from the locating slot, whilst in all other positions it remains locked in the said slot, appropriate means being provided to prevent the rod engaged in its slot from accidentally assuming the position in which it can pass through the said access opening 112c or 122c. The horizontal plane P₁ in which is located the axis of the locating slot 112b or 122b and which constitutes the plane of symmetry of the longitudinal groove 111h or 121h is also the plane of symmetry for the two horizontal edges 112d and 122d which define as regards height, the access opening 112c or 122c and which are connected towards the inside to the wall of the locating slot 112b or 122b.

The male connecting member 101 has a male guidance element 113 which is materialised by a projecting portion which at least slightly tapers in the direction of its free end which is to engage in a female guidance element of the female connecting member 102. The female element comprises a connecting cavity 123 materialised by the grooved portion of the shaped section 121, said grooved portion being located in front of the supporting partition 122 of the female connecting member 102. The projecting portion 113 is connected to the profiled section 111 of the male member 101 via the supporting partition 112 which is located at the front end of the said section 111 in such a way that its front face 112*i* is located in the same vertical transverse plane as the front end of the profiled section 101 and that of the uncut portion *s*of side member 104. The outside of projecting portion 113 is defined on the one hand by a vertical lateral face 113*a* inclined towards the front in the direction of the free end of the projecting portion 113 and located within the vertical plane determined by the lateral face 112*a* of the supporting partition 112 and on the other hand by a surface which is roughly truncated cone-shaped and whose horizontal generating line 113*g* is located in the horizontal plane $P_1$ and is recessed towards the axis of locating slot 112*b*, relative to the vertical face of the top wall 111*d* by a distance equal to at least the thickness of the said top wall 111*d*. The projecting portion 113 also has a locating slot 113*b* which is continuously connected to that 112*b* of the supporting partition 112 and which progressively widens towards the front in the direction of the free end of the said projecting portion 113. In an identical manner, the lateral axis opening 113*c* of projecting portion 113 is connected, in this case in stepped form to access opening 112*c* of supporting partition 112 and widens progressively in the direction of the free end of projecting portion 113. The locating slot 113*b* of the projecting portion 113 has a semi-cylindrical part constituting the continuation of slot 112*b* of supporting partition 112 and a semi-truncated cone-shaped part connected by its small face to the said semi-cylindrical part. The semi-cylindrical and semi-truncated cone-shaped parts of locating slot 113 are located on one side of the radial vertical plane $P_2$ of the said locating slot 113*b*, said side being turned towards the median plate 103 and towards the other connecting member of the same tub, but installed on the other side member. However, the lateral access opening 113*c* is located on the outside of locating slot 113*b* relative to the said radial vertical plane $P_2$ and has two inner faces in the form of a dihedron which extends perpendicular to said radial vertical plane and parallel to the generating lines of the locating slot 113*b*, said generating lines being located in the said radial vertical planes $P_2$.

FIGS. 10, 12 and 13 clearly show that the periphery of the projecting portion 113 tapers towards the free end, at least approximately following the shape of a truncated cone. On the outside, turned towards the other connecting member of the same tub, the projecting portion 113 is provided with a rib 113*d* which extends londitudinally relative to the longitudinal axis and the horizontal radial plane $P_1$ of locating slot 112*b* and 113*b* and which has a top face 113*e* located in the same vertical plane as the vertical inner face of the top wall 111*d* of the profiled section 111 of the male connecting member 101.

It is advantageous to join two male connecting members 101 of the same tub end in the same way as two female connecting members of the other tub end by a wear-resisting plate 114 or 124 whose rear edge 114*a* or 124*a* is welded to the extreme edge of the median plate 103 or 103′ and whereof the lateral edges are welded to the corresponding male or female connecting members. Thus, the median plate 103 or 103′ of a tub has its extreme edges level with the base of the assembly opening 107 or 107′ and either for a first fitting or for a replacement, a unit previously assembled from two connecting members integral with their wear-resisting plate is placed and fixed in the assembly openings of the side members and on the extreme edge of the median plate. Since the wear-resisting plates 114 or 124 of two adjacent tubs must be able to overlap over a length equal to a projecting portion 113 of male connecting member 101, the front portion 114*b* of wear-resisting plate 114 is on the one hand displaced downwards by approximately the thickness of the wear-resisting plate or the median plate 103 or 103′, which is of identical thickness and on the other hand connected to the rear portion 114*c* of the said wear-resisting plate 114 by a bent oblique portion 114*d* which is located slightly rearwards of the front end of the profiled section 111 and of the front face 112*i* of the supporting partition 112. It is pointed out that the said front end and the said front face 112*i* are located in the same vertical transverse plane defining at the same time the rear end of projecting portion 113.

To enable the projecting portion 113 to penetrate the connecting cavity 123 constituted by the front portion of groove 121*h* of profiled section 121 of the female member 102, despite its longitudinal rib 113*d*, the top wall 121*d* of the profiled section 121 of the female member 102 has a longitudinal passage opening 121*i* located just below the level of the median plate 103′ and of the corresponding flat wear-resisting plate 124 and which is made, level with the said rib 113*d* starting from the front face, horizontally in the top wall 121*d* of the female connecting member 102, over a length corresponding to that of the projecting portion 113.

It is clear from the drawings, that each connecting member 101 and 102 constitutes an integral part with the corresponding side member 104, 104′ and that the supporting partition 112 of the male connecting member is located in the junction zone of the front end of the profiled section 111 and the projecting portion or male guidance element 113, as well as the supporting partition of the profiled section 121 of the female connecting member 102 is located close to the rear end of the said section 121, in such a way that the groove portion 121*h* located between the front end of the said section 121 and the supporting partition 122 serves as a connecting cavity 123 to the projecting portion 113. In order to facilitate assembly by welding of profiled section 111 or 121 with the corresponding side member 104 or 104′, it should be noted that at least the horizontal joining walls 111*g* or 121*g* of the profiled section 111 or 121 have a chamfered face 111*k* or 121*k* on which is provided a weld bead.

The invention is not limited to the embodiments described and represented hereinbefore and various modifications can be made thereto without passing beyond the scope of the invention.

What is claimed is:

1. A coupling device between two adjacent tubs of a scraper conveyor for mines, in which each tub includes two side members arranged symmetrically relative to the median vertical plane of the tub and having an inverted M shaped section and a median horizontal plate connecting the two median portions of two side members, said coupling device comprising:

a male connecting member fixed to one end of each side member of one of said two adjacent tubs, a female connecting member fixed to the other end of each side member of the other of said two adjacent tubs, and a connecting rod provided with two terminal retaining flanges having shoulders, said male connecting member having a transverse supporting partition and a projecting portion which extends parallel to the side member beyond the end of the corresponding tub, said female connecting member defining a connecting cavity able to receive the projecting portion of said male connecting member and including a transverse supporting partition recessed to the end of the corresponding tub whose length is the same as that of the projecting portion, each of said male and female connecting members includes a locating slot which extends parallel to the corresponding side member and which serves to receive said connecting rod with two terminal retaining flanges, whose shoulders can cooperate with one of said supporting partitions, each of said male and female connecting members includes a lateral access opening extending parallel to the said locating slot and issuing laterally from the outside of said side member and the corresponding connecting member into said locating slot, said supporting partition of each connecting member includes a rear face providing a supporting face for one of the retaining flanges and the supporting partition of the male connecting member is constituted by the rear end of the projecting portion, the width of said lateral access opening is less than the maximum dimension of the corresponding locating slot cross-section whereby the junction zones between the lateral access opening and the locating slot constitute a lateral locking means for said connecting rod relative to the corresponding supporting partition, each connecting member having a profiled section defining a groove whose cross-section is identical to the cross-section of the median V-shaped portion of a side member having an inverted M shape, each supporting partition having a planar lateral face located in the same plane as the planar lateral face of the corresponding connecting member and, after fitting the latter in the corresponding side member, also located in the same plane as the lateral face of the latter, the supporting partition of each connecting member formed in one piece with a V-shaped section of the corresponding connecting member and extends over the entire cross-section of the groove of said profile section, and the supporting partition of the male connecting member serves as a connecting body, between the rear end of the projecting portion and the front end of the profiled sections of the said male connecting member.

2. The coupling device as claimed in claim 1, wherein two male connecting members are located at the same end of a tub and are joined together by a wear-resisting plate welded to the median portion of the inner face of said connecting members, said face being turned towards the other connecting member of the same end of the tub.

3. The coupling device as claimed in claim 2, wherein the projecting portion of the male connecting member has on its face turned towards the other male connecting member of the same tub, level with the wear-resisting plate, a longitudinal rib whose top face is located in the same plane as the inner vertical median face of the profiled section of the said connecting member with one of the edges of the wear-resisting plate welded to said vertical inner face.

4. The coupling device as claimed in claim 2, wherein the wear-resisting plate extends over the entire length of the corresponding connecting member.

5. The coupling device as claimed in claim 1, wherein the profiled section of the female connecting member has a longitudinal passage opening, starting from its front base, in the top wall of said section and extending over the length corresponding to that of the projecting portion of the male connecting member.

6. The coupling device as claimed in claim 1, wherein the supporting face of each connecting member, which serves to contact the retaining flange of the connecting rod is located in a vertical plane slightly inclined relative to the locating slot axis.

7. The coupling device as claimed in claim 1, wherein the female connecting member has a connecting cavity which is constituted by the groove of the profiled section of said corresponding member, said groove being located between the front end and the supporting partition of the said female connecting member.

8. The coupling device as claimed in claim 1, wherein the locating slot provided in the projecting portion and connected to that of the supporting partition of the male connecting member as well as the lateral access opening of the said projecting partition progressively widen in the direction of the free end of the said projecting portion.

9. The coupling device as claimed in claim 8, wherein the locating slot of the projecting portion has a semi-cylindrical part and a semi-truncated cone-shaped part connected thereto by a small face, said two parts of the slot being located on one side of the vertical radial plane of said locating slot, this side being turned towards the other connecting member of the same tub end and the access opening relative to said locating slot of the projecting portion has two faces which extend perpendicular to the radial vertical plane and parallel to the generating lines of the locating slot of the projecting portion, said generating lines being located in the said vertical radial plane.

10. The coupling device as claimed in claim 9, wherein at least the upper and lower faces which are adjacent to the vertical face of the profiled section of the connecting member are chamfered.

* * * * *